(12) United States Patent
Karp

(10) Patent No.: US 7,383,306 B2
(45) Date of Patent: Jun. 3, 2008

(54) SYSTEM AND METHOD FOR SELECTIVELY INCREASING MESSAGE TRANSACTION COSTS

(75) Inventor: Alan H. Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1001 days.

(21) Appl. No.: 10/632,402

(22) Filed: Jul. 31, 2003

(65) Prior Publication Data

US 2005/0027879 A1 Feb. 3, 2005

(51) Int. Cl.
*G06F 15/16* (2006.01)
(52) U.S. Cl. .................. 709/206; 709/207; 370/389; 370/390; 370/395.2
(58) Field of Classification Search ............... 709/206, 709/241, 238
See application file for complete search history.

(56) References Cited

U.S. PATENT DOCUMENTS

| | | | | |
|---|---|---|---|---|
| 6,691,156 | B1* | 2/2004 | Drummond et al. | 709/206 |
| 6,941,348 | B2* | 9/2005 | Petry et al. | 709/206 |
| 6,973,481 | B2* | 12/2005 | MacIntosh et al. | 709/206 |
| 7,032,023 | B1* | 4/2006 | Barrett et al. | 709/206 |
| 7,171,450 | B2* | 1/2007 | Wallace et al. | 709/206 |
| 2002/0035605 | A1* | 3/2002 | McDowell et al. | 709/206 |
| 2002/0087641 | A1* | 7/2002 | Levosky | 709/206 |
| 2006/0031298 | A1* | 2/2006 | Hasegawa | 709/206 |

OTHER PUBLICATIONS

Evan Harris. The Next Step in the Spam Control Wars: Greylisting. Jun. 22, 2003. <http://projects.puremagic.com/greylisting>.*
Transmission Control Protocol—RFC 793. Information Sciences Institute. Sep. 1981.*
Iptables. Mar. 20, 2000. <http://www.linuxguruz.com/iptables/howto/maniptables.html>.*
Understanding Your Quota. May 20, 2003. <http://physiol.ox.ac.uk/Computing/Understanding_Your_Quota.html>.*
Definition of URL. SearchNetworking.com. Feb. 25, 2004. <http://searchnetworking.techtarget.com/sDefinition/0,,sid7_gci213251,00.html>.*
Weinstein, Lauren. "Spam wars." Communications of the ACM. vol. 46, Issue 8. ACM Press. Aug. 2003. 136.*
Berghel, Hal. "Email-the good, the bad, and the ugly." Communications of the ACM. vol. 40, Issue 4. Apr. 1997. ACM Press. 11-15.*
Allman, Eric. "Spam, Spam, Spam, Spam, Spam, the FTC, and Spam" Queue. vol. 1, Issue 6. Sep. 2003. ACM Press. 62-69.*
Grant Gross—"Will Taxing E-Mail Stop Spam?"—May 27, 2003—Yahoo! News—3 pages.
Evan Harris—"The Next Step in the Spam Control War: Greylisting" —Jul. 8, 2003—12 pages.
Open Group—"The Manager's Guide to Coping with Spam" White Paper—Jul. 2003—26 pages—Lines 614-617 and Lines 713-723.

* cited by examiner

*Primary Examiner*—Jason Cardone
*Assistant Examiner*—Jeffrey R Swearingen

(57) ABSTRACT

A system and method for increasing message transaction costs is disclosed. One basic embodiment of the method includes the elements of: receiving over a data link a request to route a message to a recipient address; calculating a delay period, in response to the request; dropping the data link; receiving over the data link a next request to route a message to a recipient address; dropping the data link, if the next request was received during the delay period; and routing the message referenced in the next request to the recipient address, if the delay period has expired. The system of the present invention, includes all means for implementing the method.

10 Claims, 4 Drawing Sheets

SYSTEM AND METHOD FOR SELECTIVELY INCREASING MESSAGE TRANSACTION COSTS

BACKGROUND OF THE INVENTION

1. Field of the Invention

The present invention relates generally to systems and methods for transporting messages, and more particularly to a system and method for selectively increasing transaction costs.

2. Discussion of Background Art

Mass mailings, also known as junk mail, received through postal mail carriers is a pervasive part of most peoples lives. A desired benefit to those who originate such communications is an increase in revenues from the sale of products or services advertised in the mailing. Such physical mass mailings received by most individuals is limited, due to the transaction costs associated with their creation and mailing.

In contrast, mass e-mailings containing such advertisements are much less expensive to create and send than physical mail. As a result, the number of electronic mass mailings received by most individuals is exponentially growing, since the transaction costs are essentially mainly at the recipient's and not the sender's end. Many e-mail users receive hundreds of such junk e-mailing mailings a day. Such advertisements tend to obscure the few e-mails of real importance to a user. A term coined for such mass e-mailings is "spam." Not only does spam waste the time of most users, it's increasingly consuming a significant amount of network bandwidth and thus is shifting some of the transaction costs to service providers as well.

There have been some proposals to deal with spam, but they have their limitations. For instance, user spam e-mail filtering programs have problems such as false hits, resulting in real messages being treated as spam, and false misses, resulting in a significant amount of spam not getting filtered out. Filtering based on approved email addresses often prevents a user from receiving desired email from people not on the list. Suing spammers for consuming network resources has largely failed, especially for spammers in other countries. Several approaches have been proposed that make spam costly. One scheme requires paying for each email and having the money refunded if the mail is accepted, but there is no agreed upon form of money that can be used. Another scheme only accepts mail if the sender can prove that an expensive computation was done, but this approach requires changes to a user's e-mail program as well as the Simple Mail Transfer Protocol (SMTP) for transporting e-mail.

In response to the concerns discussed above, what is needed is a system and method that overcomes the problems of the prior art.

SUMMARY OF THE INVENTION

The present invention is a system and method for increasing message transaction costs. A first embodiment of the method includes the elements of: receiving over a data link a request to route a message to a recipient address; calculating a delay period, in response to the request; dropping the data link; receiving over the data link a next request to route a message to a recipient address; dropping the data link, if the next request was received during the delay period; and routing the message referenced in the next request to the recipient address, if the delay period has expired.

A second embodiment of the method includes the elements of: receiving over a data link a request to route a message to a recipient address; attempting to identify the recipient address; and dropping the data link with the sending computer, if the recipient address can not be identified.

A third embodiment of the method includes the elements of: generating a first set of faux addresses; making the faux addresses available; receiving over a data link a request to route a message to a faux address within the set of faux addresses; and dropping the data link, in response to the receiving element.

The system of the present invention, includes all means for implementing the method.

These and other aspects of the invention will be recognized by those skilled in the art upon review of the detailed description, drawings, and claims set forth below.

DETAILED DESCRIPTION OF THE PREFERRED EMBODIMENT

The present invention modifies the economics of spamming by selectively increasing the transaction costs of sending e-mail. This is a process of shifting the transaction costs of sending spam back on to the sender and off of the network service providers and final recipients. While such increased costs may have a minimal effect on legitimate e-mail message transport, such costs will have a significant effect on those senders of mass junk/spam e-mailings (a.k.a. "spammers").

The present invention shifts such transactions costs back on to the senders, by taking advantage of a difference in the volume of and way spam is delivered, as compared with legitimate e-mails. Some of the higher transactions costs imposed on spammers include, requiring a spammer to maintain state information about which connections have not yet been accepted during repeated message retries should the spammer wish to continue to send spam to an intended recipient. Such state information retention would require a spammer to increase their computing, storage, and network resources/costs. Since spammers often do not wish to incur such costs, the spammer will typically give up trying to spam addresses protected by the present invention.

Figure 1:
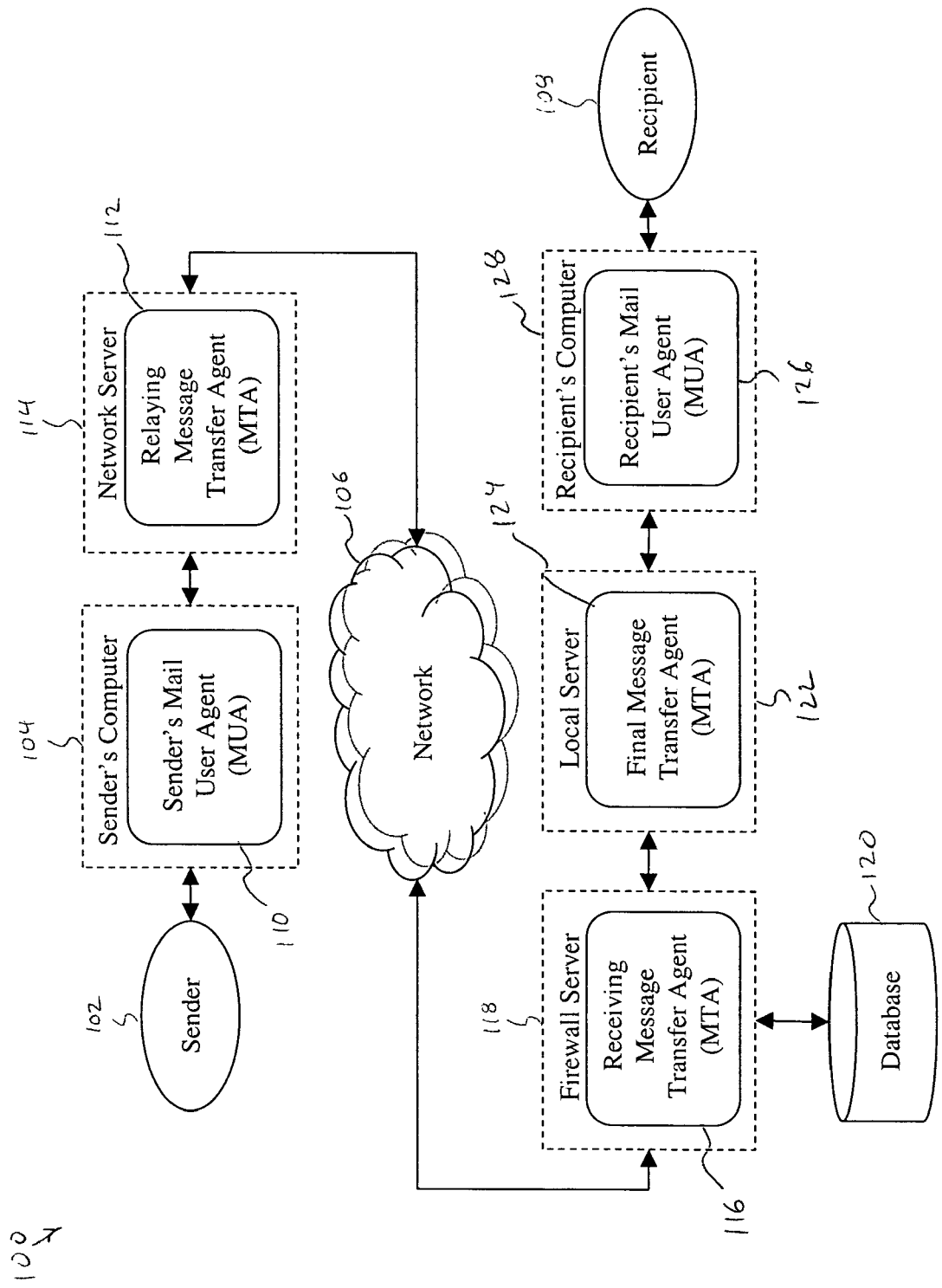
FIG. 1 is a dataflow diagram of one embodiment of a system for increasing message transaction costs.
Figure 2:
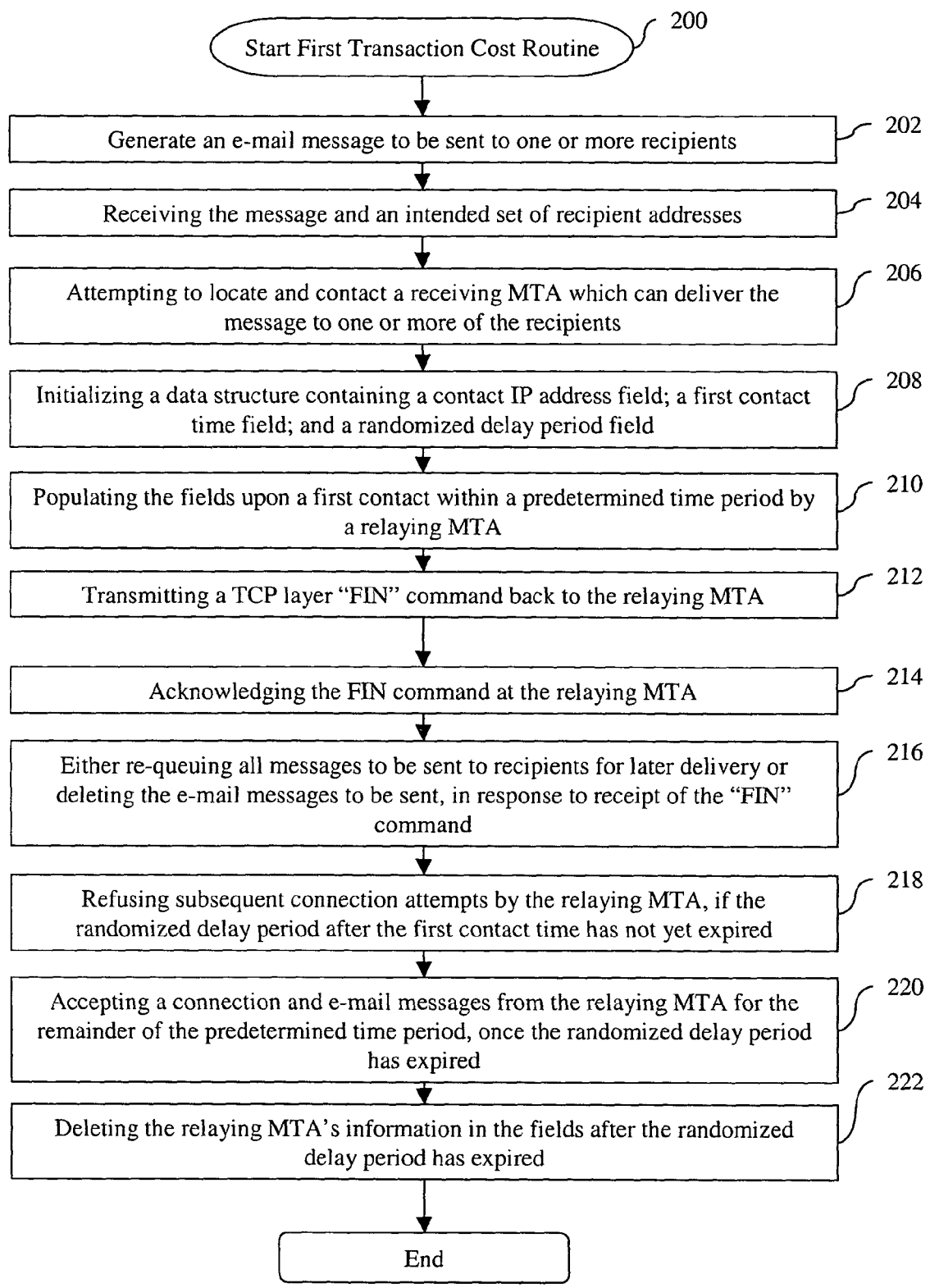
FIG. 2 is a flowchart of one embodiment of a first method for increasing message transaction costs.

FIG. 1 is a dataflow diagram of one embodiment of a system 100 for increasing message transaction costs. FIG. 2 is a flowchart of one embodiment of a first method 200 for increasing message transaction costs. FIGS. 1 and 2 are now discussed together.

To begin, in step 202, a sender 102 generates an e-mail message on a sender's computer 104 to be sent over a network 106 to one or more recipients 108. A sender's Mail User Agent (MUA) 110 operating on the sender's computer 104 actually accepts the sender's data and generates an e-mail message. MUAs allow users to access and manage e-mail, including reading, composing, deleting, printing and displaying e-mail messages. The sender's MUA 110 also organizes the sender's data into a format compatible with a Simple Message Transfer Protocol (SMTP). The SMTP protocol almost universally used for transporting e-mail over a worldwide network.

In step 204, a relaying Message Transfer Agent (MTA) 112 operating on a network server 114 receives the message and an intended set of recipient addresses over a data link. For the purposes of this specification, the phrase "a data link" is herein defined as any portion of a communication path between the sender 102 and the recipient 108 over which messages are transmitted. For example, the data link, in a narrow use, can refer to a communication path between a particular sender and a particular recipient. Alternatively, the data link, a more broad use, can refer to a communication path between a particular relaying MUA and a particular receiving MUA.

In step 206, the relaying MTA 112 attempts to locate and contact a receiving MTA 116 over the network 106 which can deliver the message to one or more recipients in the set of recipient addresses. Communications over the network 106 between the relaying MTA 112 and the receiving MTA 116 conform not only to the SMTP protocol, but also to TCP/IP and ISO/OSI protocols as necessary.

More specifically, MTAs operate as application programs on servers throughout the network 106. MTA applications map to an "application layer" (layer 7) of the ISO/OSI model. MTA applications incorporate SMTP code for transmitting e-mail messages. The SMTP code interfaces with the network according to a TCP/IP protocol. In the TCP/IP protocol. The Transmission Control Protocol (TCP) maps to a "transport layer" (layer 4) of the ISO/OSI model, and the Internet Protocol (IP) maps to a "network layer" (layer 3) of the ISO/OSI model. Note that the ISO/OSI model does not map exactly to network communications following the TCP/IP protocol, so layers 5 and 6 are usually left out. As is discussed below, important features of the present invention operate at different layers within the ISO/OSI model, and thus provide many different opportunities for blocking spam.

Note that while this discussion bifurcates the sender's computer 104 from the relaying MTA 112 on the network server 114, the sender's computer 104 and the server 114 could also be generally labeled as a sending computer. Also, note that while the recipient's computer 128 is bifurcated from the receiving MTA 116 on the firewall server 118, and the local server 122, these items 118, 122, and 128 could also be generally labeled as a receiving computer. Thus, those skilled in the art will recognize that the exact term used and/or which computer/server contains the functionality for effecting the present invention can be varied with each embodiment.

In step 208, the receiving MTA 116, which in the embodiment herein described happens to be within a firewall server 118, initializes a database 120 data structure containing the following fields: contact IP address; a first contact time; and a randomized delay period.

In step 210, upon a first contact within a predetermined time period over the data link from the relaying MTA 112, the receiving MTA 116: first, populates the contact IP address field with the IP address of the relaying MTA 112; second, populates the first contact time field with a time when the relaying MTA 112 first contacted the receiving MTA 116; and third, populates the randomized delay period. The first contact time marks the start of the predetermined time period, which is preferably one day, but which could also be of any length.

In step 212, the receiving MTA 116 then transmits a TCP layer "FIN" command back over the data link to the relaying MTA 112. In step 214, receipt of the FIN command by the relaying MTA 112 forces the relaying MTA 112 to acknowledging that the data link with the receiving MTA 116 no longer exists. Since the FIN command is sent at the TCP layer, relaying MTAs cannot ignore such a command. In contrast, "error codes" transmitted at the SMTP layer in some cases can be ignored by relaying MTA's and/or could cause confusion at a relaying MTA sending legitimate (i.e. non-spam) e-mail messages if the legitimate relaying MTA is not equipped to handle error codes and/or is not fully SMTP compliant.

In step 216, in response to receipt of the "FIN" command, the relaying MTA 112 must either re-queue all messages to be sent over the data link to recipients through the receiving MTA 116 for later delivery or must give up and delete the e-mail messages to be sent. Re-queuing is a standard step for relaying MTAs sending legitimate e-mails, however, re-queuing would be very resource intensive for a relaying MTA sending a great number of spam e-mails. As a result, such spamming relaying MTAs will tend to delete the spam e-mails, thus effectively blocking the spam from reaching the intended recipients.

In step 218, the receiving MTA 116 refuses subsequent connection attempts over the data link by the relaying MTA 112, if the randomized delay period after the first contact time has not yet expired.

In step 220, once the randomized delay period has expired, the receiving MTA 116 maintains the data link and thus accepts e-mail messages from the relaying MTA 112 for the remainder of the predetermined time period. The receiving MTA 116 then transfers the messages to a recipient's MUA 126 within the recipient's computer 128. The recipient 108 can then read the message.

In step 222, the receiving MTA 116 deletes the relaying MTA's 112 information in the database 120 after the randomized delay period has expired. The deletion of the relaying MTA's 112 information from the database allows for a new delay period, to be calculated once the predetermined time period has expired. While as mentioned above, the predetermined time period is one day, other embodiments of the present invention may recalculate the delay period either more or less often than once per day. Preferably, however, the delay period should be calculated at least every 12 hours in view of a maximum resend threshold of 12 hours observed on the Internet. Also, the iterval in which the delay period is recalculated should also not be reduced to a point where normal e-mail conversations are excessively interfered with. Since, spam is sent very broadly, whereas normal e-mail conversations tend to be much more narrowly addressed and exchanged, spammers will be more affected by a delay period than regular e-mail senders.

Figure 3:
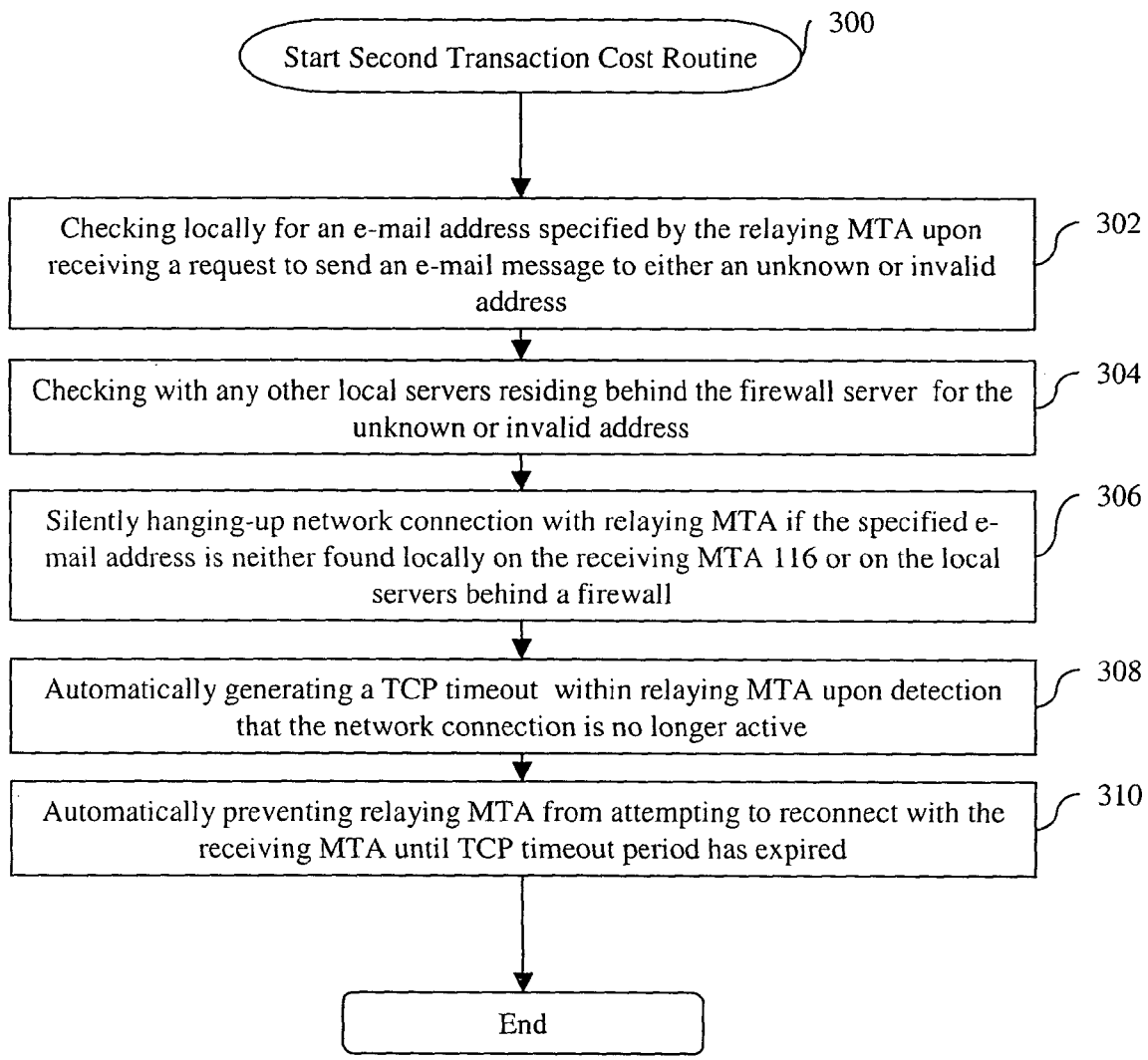
FIG. 3 is a flowchart of one embodiment of a second method for increasing message transaction costs.

FIG. 3 is a flowchart of one embodiment of a second method 300 for increasing message transaction costs. FIGS. 1 and 3 are now discussed together. The second method 300 is effective against senders of spam messages since the method 300 takes advantage of how spammers create recipient lists. More specifically, e-mail list creation programs used by spammers tend to cast a broad net in order to obtain as many e-mail addresses as possible. Interspersed within such addresses are many addresses which are either unknown or no longer valid. Currently, when relaying MTAs send message destined for an unknown/invalid addresses, receiving MTAs typically reply with a SMTP protocol error 550 "Recipient RCPT Unknown." The receiving MTAs however continue to permit the relaying MTAs to other e-mail addresses. The present invention, however, does not permit the relaying MTA 112 to continue sending messages to the receiving MTA 116, but instead penalizes the relaying MTA 112 for trying to send an e-mail message to either an unknown or invalid address.

More specifically, in step 302, upon receiving a request to send an e-mail message to either an unknown or invalid address, the receiving MTA 116 first checks locally for an e-mail address specified by the RCPT command sent by the relaying MTA 112. In step 304, the receiving MTA 116 then checks with any other local servers, such as local server 122, residing behind the firewall server 118, by sending the specified e-mail address along with an "EXPN" command to a final MTA 124 within the local server 122. The EXPN is an SMTP "expand" command requesting additional information associated with the specified e-mail address, such as the addressee's full name.

Note that the EXPN command is only one of many different methods for determining the validity of an email address. Those skilled in the art are aware of other mechanisms that may function equally well, such as the use of RCPT protocol commands within SMTP, or site specific configurations such as IDENT, or LDAP to identify valid users.

In step 306, if the specified e-mail address is neither found locally on the receiving MTA 116 or on the local server 122 by the final MTA 124, the receiving MTA 116 silently hangs-up the network connection with the relaying MTA 112. The silent hang-up is preferably done at the IP layer within the TCP/IP protocol by adding a rule to the receiving MTA's 116 firewall code which closes the TCP file handle without generating any "error codes" or sending any sort of message to the relaying MTA 112.

In step 308, the relaying MTA 112 upon detection that the network connection is no longer active, automatically generates a TCP timeout. TCP timeouts are hard-coded into most TCP/IP network chips and, in step 310 automatically prevent the relaying MTA 112 from attempting to reconnect with the receiving MTA 116 until a TCP timeout period, typically five minutes, has expired.

In contrast to the first method 200 discussed above, the TCP timeout is generated at the relaying MTA 112 every time the receiving MTA 116 silently drops the data link. Preferably, the receiving MTA 116 silently drops the data link every time a request is made to transmit an e-mail to an unknown or invalid address, and not just once per day, like the first method 200. Legitimate e-mail relaying MTAs will in most cases not be affected by the second 300 method since almost all of the e-mail addresses relayed by legitimate e-mail relaying MTAs will be valid. However, spam e-mail recipient lists, contain a disproportionately large number of unknown and invalid e-mail addresses, and thus will be much more affected and hindered by the second method 300. Thus spammers will tend to experience many annoying TCP timeouts each day.

Figure 4:
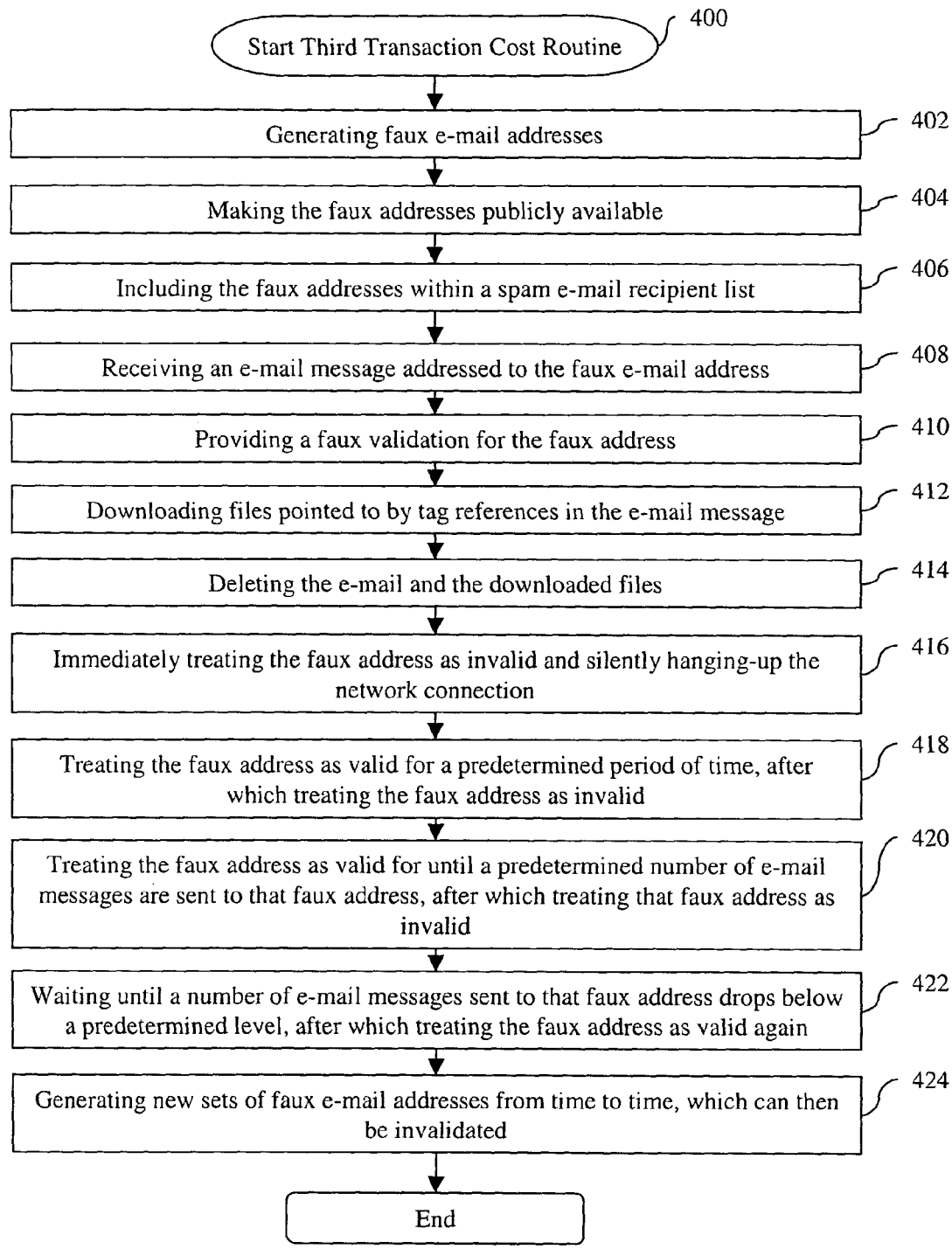
FIG. 4 is a flowchart of one embodiment of a third method for increasing message transaction costs.

FIG. 4 is a flowchart of one embodiment of a third method 400 for increasing message transaction costs. FIGS. 1 and 4 are now discussed together. The third method 400 is effective against senders of spam messages since the method 400 enhances the second method's 300 effect on spammers. More specifically, since as mentioned with respect to the second method 300, the e-mail list creation programs used by spammers tend to cast a broad net in search of e-mail addresses to spam, the third method 400 creates a sort of "Trojan horse" set of faux e-mail addresses as spammer bait. These faux addresses can either be treated immediately as invalid, thus invoking a TCP timeout, or can be treated as "valid" for a predetermined time, after they are treated as the invalid addresses. Also, different sets of faux addresses can be created from time to time for confounding senders of spam e-mail.

More specifically, in step 402, the receiving MTA 116 within the firewall server 118, generates a set of faux e-mail addresses. In step 404, the receiving MTA 116 makes the faux addresses publicly available. One way of making the faux addresses available is to publish them on the network 106. In step 406, the relaying MTA 112 includes the faux addresses within a spam e-mail recipient list. In step 408, the receiving MTA 116 receives an e-mail message addressed to one or more of the faux e-mail addresses.

Since some spam senders attempt to validate an e-mail address before either sending spam e-mail to the address or selling the address to other spammers, the receiving MTA 116, in step 410, provides a faux validation of the faux address back to the relaying MTA 112.

One technique spammers may use to determining if an e-mail address is "valid" is to insert a tag reference into an HTML portion of the e-mail message. Such a tag could be either an image reference, a document reference, or some other sort of reference which requests that information be downloaded from the network 106 or the relaying MTA 112. In this way a spam sender can indirectly detect that the e-mail message was opened due to a file downloaded with was pointed to by the tag reference. Since such tags can be made invisibly small, the recipient 108 may not even be aware that their opening of the spam e-mail was remotely detected by the sender 102. Thus, in response to this validation technique, the receiving MTA 116, in step 412, uses an HTML interpreter to look for and downloads files pointed to by any tag references in the e-mail message. This gives the relaying MTA 112 an impression that the e-mail address is valid and was opened by a real user. In step 414, the receiving MTA 116 then deletes the e-mail and any of the downloaded files.

After receiving an e-mail directed to one of the faux addresses, the receiving MTA 116 can respond using one or more of the techniques described below:

In a first response technique, in step 416, the receiving MTA 116 immediately treats the faux addresses as invalid and silently hangs-up the network connection as described with respect to the second method 300, thereby provoking a TCP timeout in the relaying MTA 112.

In a second response technique, in step 418, the receiving MTA 116 treats the faux addresses as valid for a predetermined period of time, afterwhich the receiving MTA 116 treats the faux addresses as invalid, as described with respect to the second method 300. This technique encourages the relaying MTA 112 to assign a high-validity label to the faux addresses and thus perhaps permit the faux addresses to infiltrate a larger number of spam recipient address lists, perhaps including one or more different spam senders. Spammers often sell their address lists to other spammers.

In a third response technique, in step 420, the receiving MTA 116 treats each of the faux addresses as valid until a predetermined number of e-mail messages are sent to that faux address, afterwhich the receiving MTA 116 treats that faux address as invalid, as described with respect to the second method 300. In step 422, the receiving MTA 116 then waits until a number of e-mail messages sent to that faux address drops below a predetermined level, afterwhich the receiving MTA 116 treats that faux address as valid again. This third technique has an effect similar to the technique described in step 418, except that a point at which a first spammer sells or gives the faux address to other spammers is more clear due to a dramatic increase in spam e-mail received by the faux address. The message rate tends to decrease as described in step 422 because the spammers may slowly weed out the faux address from their recipient lists in response to the TCP timeouts.

In a fouth response technique, in step 424, the receiving MTA 116 generates new sets of faux e-mail addresses from time to time, which can then be invalidated using one of the techniques discussed in steps 416 through 422.

Those skilled in the art recognize that the techniques just discussed may be incorporated into various embodiments to varying degrees. And, while one or more embodiments of the present invention have been described, those skilled in the art will recognize that various modifications may be made. Variations upon and modifications to these embodiments are provided by the present invention, which is limited only by the following claims.

What is claimed is:

1. A method for increasing message costs to minimize junk or spam emails, comprising:
   receiving at a relaying computer over a data link a request from a sending computer to route a message to a recipient address;
   calculating a delay period, in response to the request;
   sending a command from the relaying computer to the sending computer, the command causing the sending computer to re-queue the message for re-transmission of the message to the relaying computer;
   dropping the data link;
   receiving over the data link a next request to route the message to the recipient address;
   dropping the data link, if the next request was received during the delay period; and
   routing the message referenced in the next request to the recipient address, if the delay period has expired.

2. The method of claim 1:
   wherein the calculating element includes calculating the delay period once per day.

3. The method of claim 1:
   wherein the calculating element includes calculating a random delay period.

4. The method of claim 1:
   wherein the dropping element includes transmitting a transport layer command which closes the data link.

5. The method of claim 1:
   wherein the dropping element includes transmitting a TCP layer "FIN" command over the data link.

6. The method of claim 1:
   wherein the dropping element includes closing the data link at a network layer without sending any message back over the data link.

7. The method of claim 1:
   wherein the dropping element includes silently closing the data link at an IP layer.

8. The method of claim 1:
   wherein the message is an e-mail message.

9. The method of claim 1:
   wherein the receiving element includes receiving over the data link the request to route the message from the sending computer to the recipient address hosted by the relaying computer.

10. A system for increasing message transaction costs to minimize junk or spam emails, comprising a:
    sending computer;
    a relaying computer;
    means for receiving at a relaying computer over a data link a request from a sending computer to route a message to a recipient address;
    means for calculating a delay period, in response to the request;
    means for sending a command from the relaying computer to the sending computer, the command causing the sending computer to re-queue the message for re-transmission of the message to the relaying computer;
    means for dropping the data link;
    means for receiving over the data link, if the next request was received during the delay period; and
    means for routing the message referenced in the next request to the recipient address, if the delay period has expired.

* * * * *

UNITED STATES PATENT AND TRADEMARK OFFICE
CERTIFICATE OF CORRECTION

| | | |
|---|---|---|
| PATENT NO. | : 7,383,306 B2 | Page 1 of 1 |
| APPLICATION NO. | : 10/632402 | |
| DATED | : June 3, 2008 | |
| INVENTOR(S) | : Alan H. Karp | |

It is certified that error appears in the above-identified patent and that said Letters Patent is hereby corrected as shown below:

In column 4, line 44, delete "relaving" and insert -- relaying --, therefor.

In column 4, line 52, delete "iterval" and insert -- interval --, therefor.

In column 8, line 27, in Claim 10, delete "a" before "relaying".

In column 8, line 39, in Claim 10, after "data" insert -- link a next request to route the message to the recipient address; means for dropping the data --.

Signed and Sealed this

Twelfth Day of January, 2010

David J. Kappos
*Director of the United States Patent and Trademark Office*